(No Model.)  J. W. FAWKES.  2 Sheets—Sheet 1.

SPRING MOTOR.

No. 296,738.  Patented Apr. 15, 1884.

(No Model.) 2 Sheets—Sheet 2.

J. W. FAWKES.
SPRING MOTOR.

No. 296,738. Patented Apr. 15, 1884.

WITNESSES:
Charles H. Robert.
John G. Manahan.

INVENTOR:
Joseph W. Fawkes
per Cyrus Kehr
atty.

UNITED STATES PATENT OFFICE.

JOSEPH W. FAWKES, OF OAK PARK, ILLINOIS.

SPRING-MOTOR.

SPECIFICATION forming part of Letters Patent No. 296,738, dated April 15, 1884.

Application filed February 23, 1884. (No model.)

*To all whom it may concern:*

Be it known that I, JOSEPH W. FAWKES, of Oak Park, in the county of Cook and State of Illinois, have invented certain new and useful Improvements in Spring-Motors; and I do hereby declare that the following is a full, clear, and correct description thereof, reference being had to the accompanying drawings, and to the letters of reference marked thereon, which form a part of this specification.

This invention relates to spring-motors, and it has for its object, first, to provide in a cheap compact form a spring-motor by which different degrees or quantities of power may be applied to the work to be performed, thereby adapting the same motor to be put to a variety of uses—as, for example, to operate machines requiring a light power, and to operate machines requiring a heavy power; second, to provide a construction which shall obviate the use of large springs.

To these ends the invention consists in the matters hereinafter described and set forth, and particularly pointed out in the appended claims.

Figure 1:
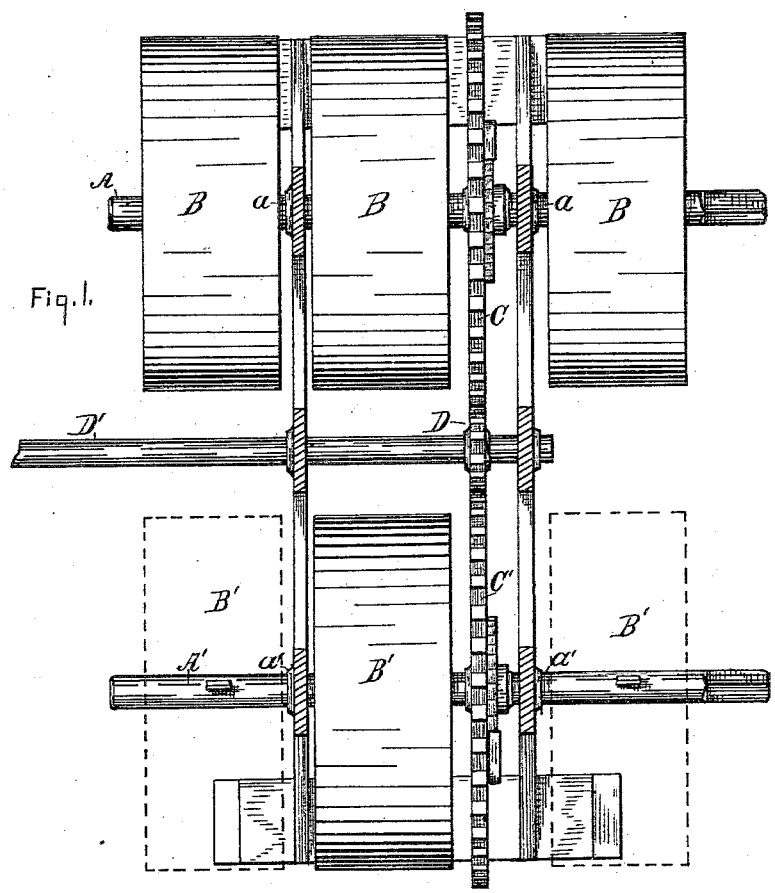
Figure 2:
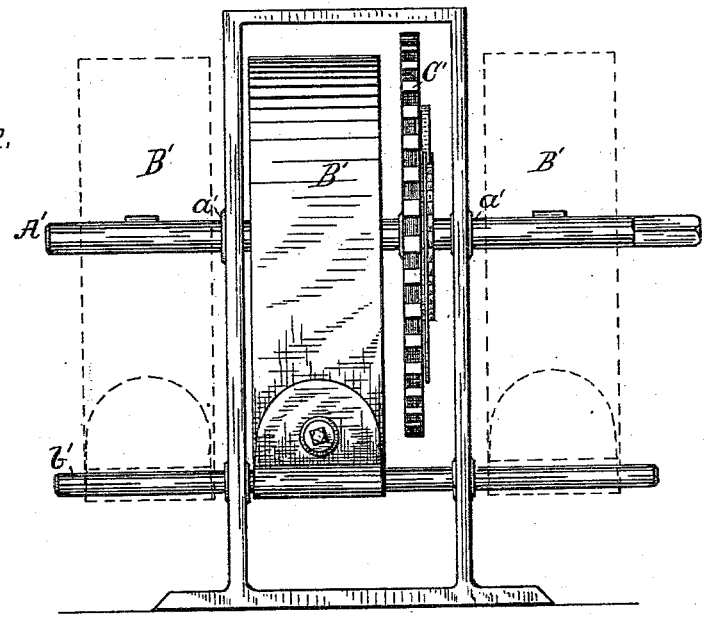
Figure 3:
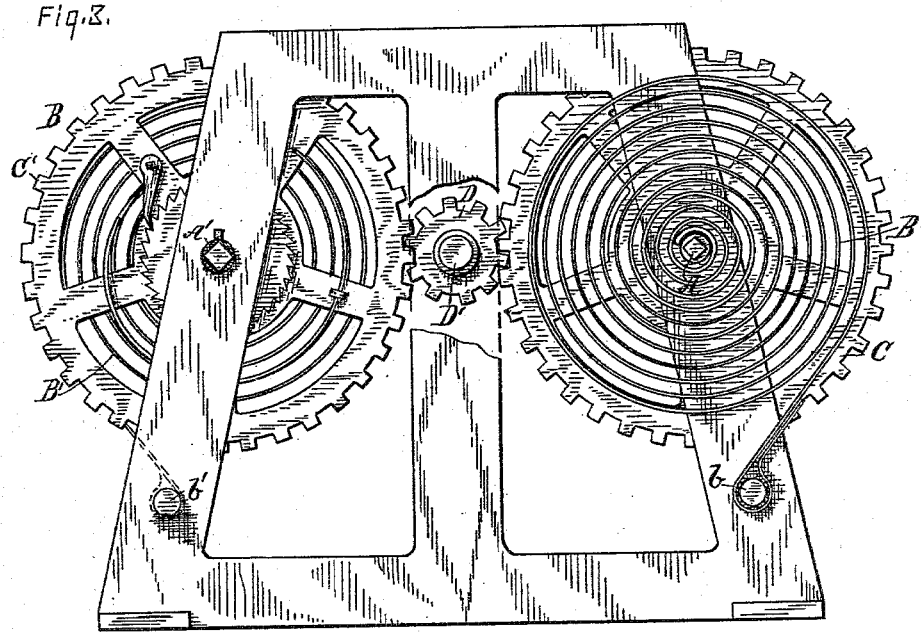

In the accompanying drawings, Figure 1 is a plan view of a motor embodying my invention. Fig. 2 is a side elevation, and Fig. 3 is an end elevation, of the same.

In said drawings, A A' are parallel rotary shafts mounted in bearings *a a*. B B B B' B' B' are ribbon-springs wound about the shafts A A', as indicated, and secured by their outer ends to fixed supports, as the rods *b b'*, the springs B B B being opposed to the springs B' B' B'. The shafts A A' are also provided with ratchet-mounted spur-wheels C C', which mesh into the wheel D on the transmitting-shaft D', and when both springs are wound co-operate in rotating said shaft D'. One of the springs on each of the shafts A A' is preferably mounted permanently between the bearings of its shaft, while one or both ends of the shafts extend beyond the bearings a sufficient distance to temporarily receive one or more springs, which shall operate in unison with the permanent one. The drawings show two removable springs on the shaft A, while the dotted lines in Figs. 1 and 2 show that two springs have been removed from the shaft A'. The rods *b b'* should also be mounted in such manner as to leave their ends free to receive the ends of the removable springs, as shown in the drawings.

Only two spring-supporting shafts are shown in the drawings; but a greater number may be arranged about the central transmitting-shaft, D'.

In using the motor a greater or less number of springs are employed, according to the amount of power required. For example, if the working power of each spring is ten pounds and a power of ten pounds is desired, a single shaft having only the permanent spring upon it is wound. If twenty pounds be required, another spring may be placed upon the same shaft, or the other shaft with but one spring upon it may also be wound. If thirty pounds be required, another spring may be added to either of the shafts, and so on for any higher degree of power. This construction enables the manufacturer to produce motors for the trade at a greatly-reduced cost, for the reason that a motor of any given size will meet the requirements of a large number of users, it being therefore necessary to manufacture only a limited number of sizes. Moreover, each motor, by reason of its manifold capacity, is of multiplied value to the user.

By the use of a multiplicity of removable or detachable springs the manufacturer is also enabled to employ small springs only. This is an important advantage, as it has been demonstrated by practice that a much higher proportion of duty may be obtained from small springs than from large ones.

I claim as my invention—

1. A spring-motor comprising a series of co-operating springs, and having a part of said springs made detachable, for the purpose of adapting said motor to render different quantities of power, substantially as shown and described.

2. In a spring-motor, a shaft, A or A', bearing a series of co-operating springs, a part of which springs are adapted to be disengaged for the purpose of deriving different quantities of power from said motor, substantially as shown and set forth.

3. In a spring-motor, a shaft, A or A', having its bearings at such distance from its ends as to adapt said ends to receive one or more springs, substantially as and for the purposes set forth.

4. In a spring-motor, a shaft, A, and rod b, each having its bearings at such distance from its ends as to adapt said shaft and rod to receive one or more springs, B, substantially as shown and described.

5. A spring-motor comprising a series of co-operating shafts, A A', each bearing a series of detachable or removable springs, substantially as and for the purposes specified.

6. In a spring-motor, a series of shafts, A A', arranged about a central transmitting-shaft, D', said shafts A A' each bearing a series of detachable or removable springs, substantially as shown and set forth.

In testimony whereof I have hereunto set my hand in presence of two witnesses.

JOSEPH W. FAWKES.

Witnesses:
 CYRUS KEHR,
 CHARLES H. ROBERTS.